Aug. 30, 1932.　　G. HEYMER　　1,874,529
PRINTING PICTURES OF A LENTICULAR FILM
Filed May 6, 1930
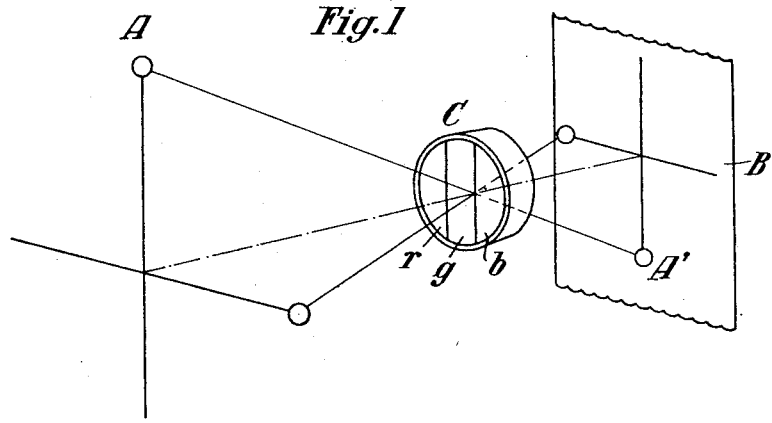
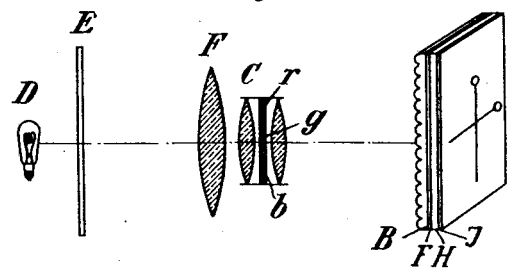
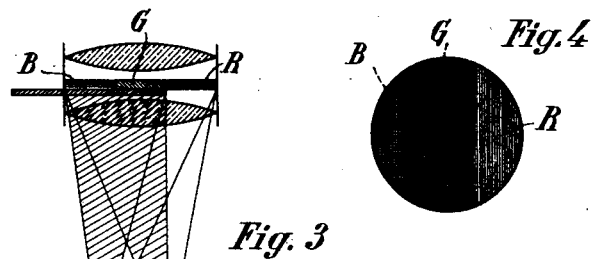
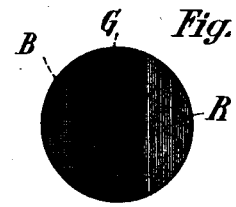
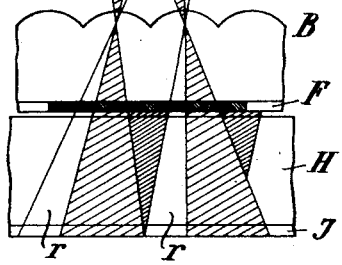
Gerd Heymer, Inventor,
By Philip S. Hopkins, Attorney Patented Aug. 30, 1932

1,874,529

UNITED STATES PATENT OFFICE

GERD HEYMER, OF DESSAU-ZIEBIGK IN ANHALT, GERMANY, ASSIGNOR TO AGFA ANSCO CORPORATION, OF BINGHAMTON, NEW YORK, A CORPORATION OF NEW YORK

PRINTING PICTURES OF A LENTICULAR FILM

Application filed May 6, 1930, Serial No. 450,238, and in Germany May 8, 1929.

My present invention relates to a process of printing a lenticular film on to a photographic sensitive material not provided with refractive lenticular elements.

The lenticular film, the principle of which is set forth in U. S. Patent Specification No. 992,151, though in first place intended to be used for cinematographic purposes, may also be adopted for producing single photographic color pictures. Now the problem arises to print from the lenticular film on to any photographic material the support of which is not provided with refractive microscopic lens elements. For this purpose orthochromatic, as well as panchromatic silver halide emulsion layers, may be used and also layers which are exposed to light behind a screen formed of colored grains or lines. Finally, layers not containing a silver salt may likewise be used as printing material, it being, however, in all cases important to obtain the pictures not laterally reversed.

According to my invention prints are obtained, which as regards their sides substantially correspond with the original, by exposing the negative film, with or without the application of a color screen, with the side carrying the refractive lenticular elements facing towards an objective equal in function to the optical system by means of which the negative film was originally exposed. As lens system the objective may be used which has served for exposing the negative film. Since, however, it is as a rule advantageous when printing to select other focal lengths than those used in taking the picture, there is chosen in these cases for the exposure an optical system which is equal in function to the lens system selected for taking the picture, especially with respect to the position of the plane of the color screen. A sharp definition of the pictures is obtained by placing immediately before the condenser a lens, of the same or of a larger diameter than that of the condenser, in the focal plane of which a luminous screen, for instance, a milk glass or the like is arranged. By this arrangement of the lenses any predominance of colors is avoided.

The lens system may be used either with or without the multicolor screen employed for taking the picture. Since the color screen impairs the light intensity it will only be used if the positive material is panchromatically sensitized, that is to say, if one intends, for instance, to print on to the known color plate. If, however, monochromatic sensation pictures, for example, for a three-color process, are to be prepared from the negative lenticular film it is generally preferable to operate without a color screen, because in this case in the positive layer only a black and white picture has to be produced corresponding with the color values of a single color.

The negative film must be illuminated through the objective above described in such a manner that if the color screen is placed in the objective the negative film shows when viewed from the emulsion side a picture in which the colors of the object are represented by their complementary colors.

If no enlargement or reduction of the pictures is desired, the negative film illuminated as above described, is advantageously printed by contact, that is to say, the positive material is brought into an intimate contact with the emulsion side of the negative film. This process is always applicable with advantage if, in printing, the incident rays need not take a prevailing direction or if it becomes necessary to print from the back side (carbon print or the like) because when the picture is viewed from the side on which the rays are incident during the exposure, it appears laterally reversed. If, however, an enlargement or a reduction is to be produced the negative film illuminated in the same manner is printed by optical means on to the positive material according to one of the known methods. The optical enlarging system must be arranged in such a manner that all the rays emanating from the negative film are caught by it and are utilized for projecting the picture.

If the picture printed according to the process of the present invention is to be viewed from that side on which the rays have been incident in printing, that is to say, if the picture to be viewed by reflection has to be produced, a reversal system of known construction, for instance, a mirror or a totally reflecting prism, must be interposed in the course of rays in order to obtain the pictures with their sides not laterally reversed.

If, for instance, red, green and blue sensations are to be produced from the negative lenticular film, only rays of a single color are allowed to impress the positive layer at each exposure. For this purpose, there is fitted into the plane of the color screen of the condenser a diaphragm which masks during each exposure the area of all but one of the color strips reproduced by the filter. In this case, the color screen itself can generally be dispensed with. When the color screen is removed from the objective, the diaphragm must be placed at a point which corresponds with the position of the color screen.

In order to clearly illustrate the subject of the present invention, there has been described above only the particular case in which, on a sensitive layer the support of which is free from microscopic lens elements, a picture is produced from a negative film the support of which is embossed with refractive lenticular elements. The process can, of course, also be used for printing a negative from a positive lenticular film. With the aid of one of the known photographic reversal processes negatives may furthermore be printed in the same manner from lenticular negatives and likewise positives from lenticular positives.

My invention may become more intelligible by the following illustration, reference being made to the accompanying drawing.

Figure 1 shows perspectively the course of the light rays when taking a picture on a lenticular film.

Figure 2 illustrates the printing of a lenticular film on a color plate.

Figure 3 illustrates in detail the course of the light rays during printing, and Figure 4 shows a mask for partially stopping the colored light rays.

Fig. 1 is a perspective view showing the position of an object A and of its image A' on the lenticular film B reproduced by the objective C in the optical center of which is placed a diaphragm with three apertures respectively covered by red, green and blue screens ($r$, $g$, $b$). As shown in Fig. 1 the image A' is seen laterally reversed when viewed from the side facing towards the objective. Contrary thereto, the image is seen not laterally reversed when viewed from the emulsion side of the film not facing the objective.

Fig. 2 shows diagrammatically an arrangement used when printing on a light sensitive material which is to be illuminated from its rear side, for instance, on a color plate. D is an incandescent lamp which illuminates the light dispersing screen E consisting, for instance, of milk glass on its rear side. The screen E is placed in the focus of the lens F. C is the objective used when exposing the lenticular film B which is to be printed, or an objective in which the color screen or its virtual image has the same position with respect to the lenticular film B placed in the focus plane of the objective. $r$, $g$ and $b$ represent the light filters or those places of the objective where during exposure these filters were placed. Due to the arrangement of the lens F with respect to the objective, an image of the uniformly illuminated screen E is reproduced on the film B and thus, the latter, too, is uniformly lighted and without predominance of certain colors if the three-color screen is placed on the proper place in the objective. Since, the position of the color-screen in this printing device is identical with that during exposure of the film B, and since, in general, all optical relations maintained in exposure are reconstructed, the course of the light rays beneath the microscopic lenticular elements of the film B must be identical with that during exposure. That is to say, that all light rays which during exposure were incident on the film B from the plane R (see Fig. 3) and caused impression on the light sensitive layer F at $r$—$r$ which, after development and reversal to form a positive, becomes translucent at $r$—$r$, must take the same course.

In Fig. 3 showing the course of the light rays between the objective and the film on which is printed, a part of the film is illustrated at which the action of yellow light rays is registered; that means, that on this film all parts $r, g, r, g$ are translucent at which the red filter R and the green filter G in the objective used during exposure, are reproduced. Now, when printing from the lenticular film only the sensation corresponding to the red screen, I mask the blue and green screens B and G (in the manner seen in Fig. 4) and I illuminate the lenticular film only through the red screen R while maintaining the other optical relations. Then, light rays are incident through the lenticular film B only on the places $r, r$. When placing a film H with the light sensitive layer I against the layer F of the lenticular film B, light impressions are obtainable in the layer I corresponding to the red sensation of the film B. To obtain sharply defined reproduction of the individual screen lines $r, r$ a light dispersing medium, for instance, a mat-film may be added between the layer F and the print H.

Numerous other embodiments are possible and I contemplate as included within my invention all such modifications and equivalents as fall into the scope of the appended claims.

What I claim is:—

1. Process of printing a picture from a lenticular film onto a light sensitive layer carried on a smooth support without lateral inversion which comprises disposing the light sensitive printing layer towards the emulsion side of the lenticular film, and illuminating the latter through its support by means of an objective being functionally equal to the objective employed in taking the picture on the lenticular film.

2. Process of printing a picture from a lenticular film onto a light sensitive layer carried on a color screen of any known type without lateral inversion, which comprises arranging the light sensitive printing film towards the emulsion side of the lenticular film and illuminating the latter through its support by means of an objective and a multi-color filter being functionally equal to the objective and filter employed in taking the picture on the lenticular film.

3. Process of printing a picture from a lenticular film onto a light sensitive layer carried on a smooth support without lateral inversion which comprises disposing the light sensitive printing layer towards the emulsion side of the lenticular film, illuminating the latter through its support by means of an objective being functionally equal to the objective employed in taking the picture on the lenticular film and stopping the light rays emanating from all but one stripe of the virtual filter image produced by the objective.

4. Process of printing a picture from a lenticular film onto a light sensitive layer carried on a smooth support without lateral inversion which comprises disposing the light sensitive printing layer towards the emulsion side of the lenticular film, illuminating the latter through its support by means of an objective presenting the same location of the virtual filter image as the objective employed in taking the picture on the lenticular film and stopping the light rays emanating from all but one stripe of the virtual filter image produced by the objective.

5. Process of printing a picture from a lenticular film onto a light sensitive layer carried on a smooth support without lateral inversion which comprises disposing the light sensitive printing film in contact with the emulsion side of the lenticular film, illuminating the latter through its support by means of an objective being functionally equal to the objective employed in taking the picture on the lenticular film and stopping the light rays emanating from all but one stripe of the virtual filter image produced by the objective.

6. Process of printing a picture from a lenticular film onto a light sensitive layer carried on a smooth support without lateral inversion which comprises disposing the light sensitive printing layer towards the emulsion side of the lenticular film, illuminating the latter through its support by means of an objective being functionally equal to the objective employed in taking the picture on the lenticular film and reversing the image before being registered on the printing layer.

In testimony whereof I affix my signature.
GERD HEYMER.